United States Patent [19]

Lee

[11] 4,235,436
[45] Nov. 25, 1980

[54] WORK CONTROL APPARATUS FOR AN EXERCISER

[75] Inventor: Cleve L. Lee, St. Louis, Mo.

[73] Assignee: The Perfection Manufacturing Company, St. Louis, Mo.

[21] Appl. No.: 7,023

[22] Filed: Jan. 29, 1979

[51] Int. Cl.³ .............................................. A63B 69/16
[52] U.S. Cl. ............................... 272/73; 272/DIG. 4; 272/DIG. 5; 188/24
[58] Field of Search .............. 188/265, 106 R, 106 P, 188/83, 24; 272/73, DIG. 3, DIG. 4, DIG. 5, 116, 131, 132; 74/538, 541, 489, 501.5, 502

[56] References Cited

U.S. PATENT DOCUMENTS

| 1,127,203 | 2/1915 | Deyoung | 188/265 X |
| 3,948,361 | 4/1976 | Carlson | 188/24 |
| 4,066,154 | 1/1978 | Ross | 188/24 X |
| 4,148,478 | 4/1979 | Moyski et al. | 272/73 |

FOREIGN PATENT DOCUMENTS

| 98214 | 7/1898 | Fed. Rep. of Germany | 188/24 |
| 828400 | 2/1938 | France | 188/106 R |
| 21784 | of 1908 | United Kingdom | 74/489 |

Primary Examiner—Richard C. Pinkham
Assistant Examiner—Arnold W. Kramer
Attorney, Agent, or Firm—Cohn, Powell & Hind

[57] ABSTRACT

A work control apparatus in a bicycle exerciser having a driven member rotatively mounted on a exerciser frame. The work control apparatus includes a housing mounted to the frame and providing support for a spring loaded, pivotally mounted lever connected to a brake assembly for selectively determining the braking pressure exerted on the driven member. A sliding member is mounted to an inclined bearing plane on the housing, and is selectively engageable with a bearing portion of the lever to hold it in a predetermined position. The lever bearing portion is rotatable about the pivot axis to define an acute axis of intersection with the inclined bearing plane, facilitating the bearing engagement of the sliding member and the engagement of the sliding member with the lever provides a visual indication of the pressure exerted on the driven member by the brake assembly. A handle mounted on the exerciser frame and connected to the lever by a cable is used to pivot the lever to selectively determine the braking pressure on the driven member.

9 Claims, 4 Drawing Figures

WORK CONTROL APPARATUS FOR AN EXERCISER

BACKGROUND OF THE INVENTION

This invention relates generally to improvements in a work control apparatus in an exerciser, and more particularly to an improved apparatus in a bicycle exerciser providing a means of selectively predetermining and maintaining the brake pressure.

In the heretofore conventional work control apparatus utilized in an exerciser of this type, a control knob is provided which is used to regulate the braking pressure. The full range of pressure adjustment required that the knob be rotated considerable number of revolutions. This was a somewhat slow procedure and required a similar operation to readjust the knob to a different pressure. Moreover, with this particular type of device because of the large revolution range of the knob, it was difficult to readjust the knob to a particular predetermined pressure once the knob had been moved several revolutions, simply by reliance upon the indicator provided on the knob.

SUMMARY OF THE INVENTION

The present work control apparatus overcomes the functional disadvantages of known conventional apparatus, and readily permits a desired braking pressure to be obtained, and maintained until a different pressure is required.

The work control apparatus includes a brake means operatively mounted on the exerciser frame and engaging the driven member, a support means operatively mounted to the frame, a lever means pivotally mounted to the support means and connected to the brake means for selectively determining the brake pressure exerted on the driven member, resilient means between the brake means and the lever means tending to resist rotational movement of the lever means in one direction and means slidingly mounted to one of said support means and lever means, and selectively engaging the other of said support means to hold the lever means in the predetermined position relative to the support means against the action of the resilient means.

More particularly, the support means includes a housing having a bearing portion, the lever means includes a bearing portion selectively inclined relative to the housing bearing portion and the sliding means includes a sliding member movably mounted to one of said bearing portions for engagement with the other of said bearing portions.

In the preferred embodiment, the housing bearing portion provides an inclined plane and the lever bearing portion is rotatable about the pivot axis to define an acute angle with the inclined bearing plane of the housing which selectively increases with rotation of the lever means in one direction and selectively decreases with rotation of the lever means in the other direction, the sliding member being mounted for movement on the inclined bearing plane for incremental engagement with the bearing portion of the lever means as the angle is decreased.

Also in the preferred embodiment, the housing includes an upper wall having an opening providing side elements defining the bearing plane and the sliding member includes opposed side elements compatibly engaging the upper wall side elements in sliding relation.

The inclined bearing plane is sufficiently inclined to permit movement of the sliding member down the plane under gravitational force and the sliding member includes a handle portion for moving the sliding member in an opposite direction.

The lever means includes a pivot pin extending between the sides of the housing and a rod received through the exerciser frame is connected to the pin at one end and is removably connected to the frame at the other end to connect the housing to the frame in removable relation.

The brake means includes a handle mounted to the exerciser frame handle bars, a cable connected between the handle and the lever means, a pair of caliper brake elements including return spring elements providing the resilient means and connection means between the caliper brake elements and the lever means.

The lever means includes opposed end portions, one of which is connected to the brake elements and the other of which is movable between the housing upper wall opening side margins as the lever means rotates.

DESCRIPTION OF THE PREFERRED EMBODIMENT

Figure 1:
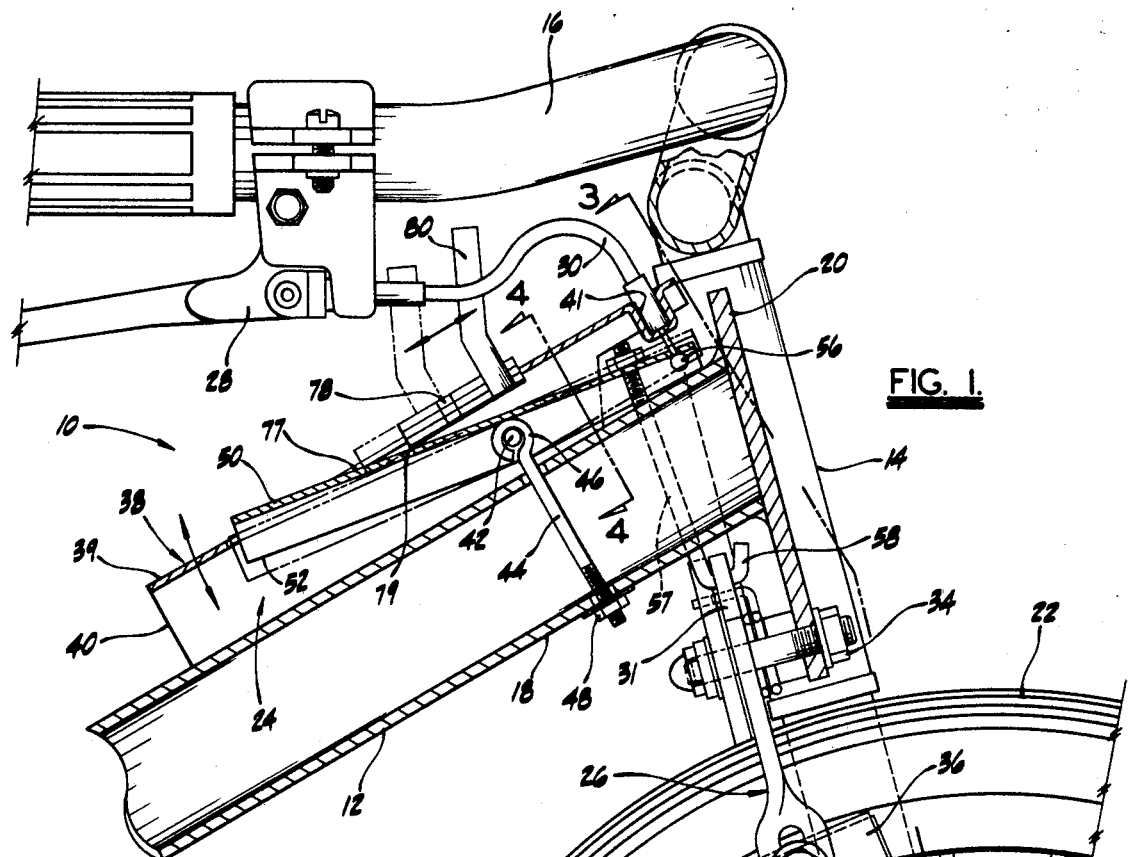
FIG. 1 is an elevational view, partly in cross section of the work control apparatus in an exerciser.

Referring now by reference numerals to the drawings, and first to FIG. 1, it will be understood that the exerciser 10 is of a bicycle type having an exerciser frame 12 which includes a front fork portion 14, having a transverse handle bar portion 16 at the upper end thereof, and an intermediate, longitudinal frame portion 18, having an end plate 20 by which it is attached, as by welding, to the fork portion 14. As is conventional, a wheel 22, constituting a driven member, is rotatively mounted between the frame fork portion 14 and below the longitudinal frame portion 18. As is also conventional, an appropriate drive means such as a foot pedal and sprocket-chain connection with the driven wheel 22 is provided, but not shown, whereby the user can rotate the driven wheel 22 by leg power.

Figure 3:
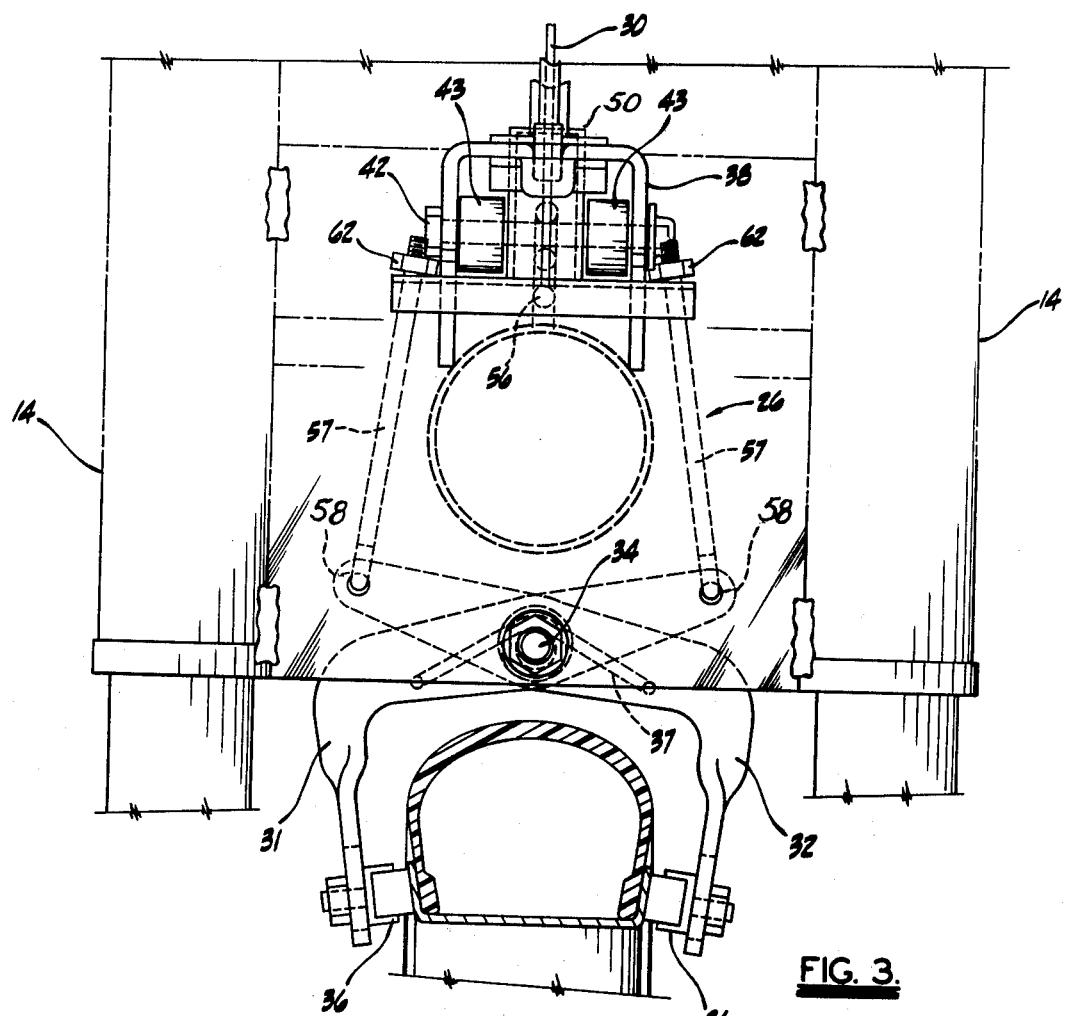
FIG. 3 is a cross-sectional view as taken on line 3—3 of FIG. 1.

The work control apparatus is generally indicated by numeral 24 and includes a caliper brake assembly 26 best shown in FIG. 3. The caliper brake assembly 26 is somewhat conventional in that it includes a brake handle 28 mounted to the handle bar portion 16; a brake cable 30; and a double pull caliper brake elements 31 and 32, which are mounted to frame plate 20 by fastener 34 and are each provided with wheel engageable brake shoes 36 and return spring 37. In effect, the brake shoes 36 provide a brake means and the return springs provide a resilient means tending to urge the shoes out of engagement with the driven member. The brake assembly 26 is unconventional in that the brake cable 30 is connected indirectly to the brake elements 31 and 32 by means of a lever which forms another part of the work control assembly 24 as will now be described.

Figure 4:
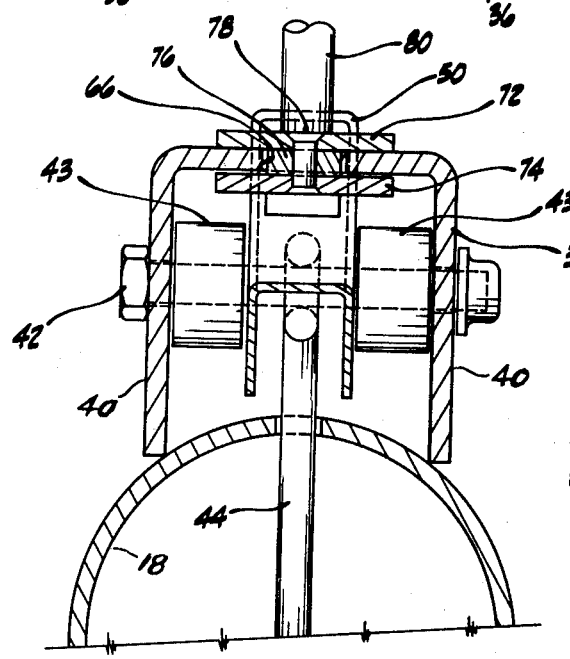
FIG. 4 is a cross-sectional view as taken on line 4—4 of FIG. 1, and enlarged.

As clearly shown in FIGS. 1 and 4 the work control assembly 24 includes a housing 38, which is substantially U-shaped having an upper wall 39 providing an apertured socketed portion 41 receiving the cable 30, and depending sidewalls 40 engageable with the frame portion 18 at their lower end. A pivot pin 42 extends between said housing sidewalls 40, and the housing 38 is held in place on said frame by means of an anchor bolt 44 extending through the exerciser frame portion 18. The bolt 44 is provided with an eye 46 at the upper end, which receives the pivot pin 42 and said bolt is threaded at the lower end to receive a nut 48 which is adjustable on the bolt and engages said frame portion 18 to urge the housing 38 against said frame portion when tightened.

Figure 2:
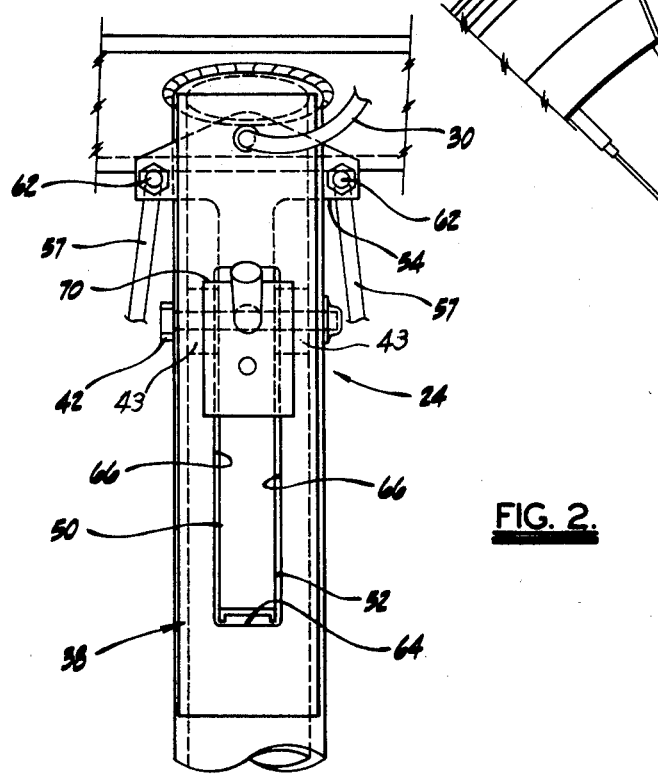
FIG. 2 is a fragmentary top plan view longitudinally of the work control apparatus shown in FIG. 1.

As shown in FIG. 2, the pivot pin 42 is provided with spacers 43 and provides a pivotal mounting for a lever 50, which includes an elongate, generally U-shaped body 52 having a transverse portion 54 at the forward end apertured to receive and hold a stop 56 at the lower end of the cable 30 (FIG. 1). As will be readily understood, the application of an upward force from the cable 30, by squeezing the brake handle 28, tends to rotate the lever 50 in a counterclockwise direction. In the embodiment shown, see FIGS. 1 and 3, the lever 50 is connected to the caliper brake elements 31 and 32 by means of rods 57 having hook portions 58 at the lower end and threaded upper portions by which the rods are attached to the apertured outer ends of the lever transverse portion 54 by means of nuts 62. In this manner, the brake shoes 36 are urged into engagement with the wheel 22 upon counterclockwise rotation of the lever 50.

As best shown in FIG. 2, the housing 38 includes an elongate opening 64 having opposed margin portions 66 providing bearing means. A slide member 70 is mounted in the opening 64. As clearly shown by FIGS. 1 and 4, the slide member 70 includes upper and lower plate members 72 and 74, which are overlappingly disposed on the side margins 66, and a relatively narrow spacer plate 76 disposed between said upper and lower members and attached thereto as by a fastener 78. The plate members 72, 74, and 76 define side grooves compatibly configurated to receive the side margins of the opening 64 and the thickness of the spacer 76 is sufficient to permit the slide member 70 to move freely in the housing opening 64 and travel downwardly under gravity so that the sliding member corner 79 engages the bearing portion provided by the upper face 77 of the lever 50. In this way, the sliding member is wedged between the housing 38 and the lever 50 and when bearing portion of the lever 50 moves counterclockwise, away from the housing, the slide member 70 moves incrementally downward with rotation of said lever. The slide member 70 includes a fixed handle 80, which provides a means of manually moving said member in an upward direction.

The use of the work control apparatus 24 is briefly described as follows. Because of the inclination of the margins of the housing 38 mounted on the inclined frame portion 18, the slide member 70 tends to move downwardly under gravity. Such downward movement is restricted by engagement of the slide member 70 with the upper surface of the lever 50. The engagement of the slide member 70 with the lever 50, particularly in view of the acuteness of the angle between the inclined plane bearing surfaces and the intersection plane defined by the upper face of the lever engageable by the slide member, precludes clockwise rotation of the lever by reason of the wedging effect of the slide member. For this reason, the disposition of the lever 50, and hence the disposition of the caliper brake elements 31 and 32 carrying the brake shoes 36 is controlled by the slide member. Thus, the brake pressure exerted by the user through the medium of the caliper brake assembly 26 will be maintained until the lever 50 is rotated. Such rotation in a counterclockwise direction, which increases the braking force, is achieved by applying an upward force to the brake cable 30 by means of the brake handle 28. Rotation of the lever in a clockwise direction to relieve the brake pressure is achieved by manually moving the slide member 70 upwardly. This is accomplished by pulling on the brake cable 30 slightly to relieve the bite of the slide member 70 while at the same time pulling said slide member out of engagement with the lever and upwardly on the opening bearing margins 66. By this arrangement, the slide member 70 not only controls a sustained brake pressure, but also acts to indicate such pressure visually by virtue of its longitudinal disposition in the housing opening 64.

I claim as my invention:

1. A work control assembly in an exerciser having a frame, and a driven member rotatively mounted on the frame, the assembly comprising:
    (a) a brake means operatively mounted on the exerciser frame and engaging the driven member.
    (b) a support means operatively mounted to the frame, and including a pivot axis,
    (c) a lever means pivotally mounted to the support means for rotation about the pivot axis and connected to the brake means for selectively determining the braking pressure exerted on the driven member,
    (d) resilient means between the brake means and the lever means tending to resist rotational movement of the lever means in one direction,
    (e) means slidingly mounted to one of said support means and lever means and selectively engaging the other of said means to hold the lever means in a predetermined position relative to the support means against the action of the resilient means, and
    (f) the brake means including:
        1. a handle mounted to the exerciser frame, and
        2. a cable connected between the handle and the lever means for rotating the lever means in said one direction.

2. A work control assembly in an exerciser as defined in claim 1, in which:
    (g) the support means includes a housing having a bearing portion,
    (h) the lever means includes a bearing portion selectively inclined relative to the housing bearing portion, and
    (i) the sliding means includes a sliding member movably mounted to one of said bearing portions for engagement with the other of said bearing portions.

3. A work control assembly in an exerciser as defined in claim 1, in which:
    (g) the support means includes a housing having an inclined bearing plane offset from the pivot axis,
    (h) the lever means includes a bearing portion rotatable about the pivot axis and defining an acute angle with the inclined bearing plane which selectively increases with rotation of the lever means in one direction and selectively decreases with rotation of the lever means in the other direction, and (i) the sliding means includes a sliding member movably mounted to the inclined bearing plane for incremental engagement with the bearing portion of the lever means as the angle is decreased.

4. A work control assembly in an exerciser as defined in claim 3, in which:
(j) the housing includes an upper wall having an opening providing side elements defining the bearing plane, and
(k) the sliding member includes opposed side elements engaging the wall side elements in sliding relation.

5. A work control assembly in an exerciser as defined in claim 4, in which:
(l) the opening includes opposed side margins providing the side elements, and
(m) the sliding member includes opposed grooves providing the side elements.

6. A work control assembly in an exerciser as defined in claim 3, in which:
(j) the inclined bearing plane is sufficiently inclined to permit movement of the sliding member down said plane under gravitational force, and
(k) the sliding member includes a handle portion for moving the sliding member in the opposite direction.

7. A work control assembly in an exerciser as defined in claim 3, in which:
(j) the housing includes an upper wall and opposed side walls,
(k) the lever means includes a pivot pin extending between said side walls, and
(l) a rod received through the frame and having one end connected to the pin and the other end removably connected to the frame connects the housing to the frame in removable relation.

8. A work control assembly in an exerciser as defined in claim 3, in which:
(j) the brake means includes:
  1. a pair of caliper brake elements including return spring elements providing the resilient means, and
  2. connection means between the caliper brake elements and the lever means.

9. A work control assembly in an exerciser as defined in claim 3, in which:
(j) the housing includes an upper wall having an opening providing side elements defining the bearing plane,
(k) the sliding member includes opposed side elements compatibly engaging the wall side elements in sliding relation, and
(l) the lever means includes opposed end portions, one of said end portions being connected to the brake means and the other of said end portions being movable between the wall side elements as the lever means rotates.

* * * * *